United States Patent
Takatsuka

(10) Patent No.: US 7,055,699 B2
(45) Date of Patent: Jun. 6, 2006

(54) SELF-CLEANING MECHANICAL FILTER

(75) Inventor: Mitsuo Takatsuka, Tokyo (JP)

(73) Assignee: Amiad Japan Inc., Tokyo (JP)

( * ) Notice: Subject to any disclaimer, the term of this patent is extended or adjusted under 35 U.S.C. 154(b) by 60 days.

(21) Appl. No.: 10/930,859

(22) Filed: Sep. 1, 2004

(65) Prior Publication Data

US 2006/0043014 A1    Mar. 2, 2006

(51) Int. Cl.
*B01D 29/58*    (2006.01)
*B01D 29/68*    (2006.01)
*B01D 29/94*    (2006.01)

(52) U.S. Cl. .................... 210/408; 210/411; 210/415; 210/107; 210/108; 210/414

(58) Field of Classification Search ................ 210/411, 210/408, 415, 414, 107, 108
See application file for complete search history.

(56) References Cited

U.S. PATENT DOCUMENTS

| | | | | |
|---|---|---|---|---|
| 1,591,821 A | * | 7/1926 | Heaton | 210/392 |
| 1,950,466 A | * | 3/1934 | Wille et al. | 210/392 |
| 2,310,587 A | * | 2/1943 | MacNeill | 210/411 |
| 3,074,556 A | * | 1/1963 | Rosaen | 210/195.1 |
| 3,074,560 A | * | 1/1963 | Kinney | 210/330 |
| 4,315,820 A | * | 2/1982 | Mann et al. | 210/408 |
| 4,692,247 A | * | 9/1987 | Orlans | 210/314 |
| 4,702,847 A | * | 10/1987 | Fux et al. | 210/798 |
| 4,859,335 A | * | 8/1989 | Whyte | 210/393 |
| 5,409,618 A | * | 4/1995 | Price | 210/784 |
| 6,001,242 A | * | 12/1999 | England et al. | 210/87 |
| 6,267,879 B1 | * | 7/2001 | Gil | 210/107 |

FOREIGN PATENT DOCUMENTS

JP    2004-141785    *    5/2004
JP    2004-141785 A    *    5/2004

* cited by examiner

*Primary Examiner*—Thomas M. Lithgow
(74) *Attorney, Agent, or Firm*—Oliff & Berridge, PLC

(57) ABSTRACT

A self-cleaning mechanical filter comprises a mechanism for simultaneously cleaning the internal surface and the external surface of a filter element. The filter is provided with structure for performing suction scanning of solid materials accumulated on the internal surface of the filter element, and structure which can be operated in synchronization with the suction scanning structure for backwashing the external surface of the filter element during a self-cleaning process.

1 Claim, 6 Drawing Sheets

VIEW A — A

VIEW B — B

SELF-CLEANING MECHANICAL FILTER

CROSS-REFERENCE TO RELATED APPLICATION

The entire disclosure of Japanese Patent Application No. 2002-310706 including specification, claims, drawings and abstract is incorporated herein by reference in its entirety.

BACKGROUND OF THE INVENTION

1. Field of the Invention

The present invention relates to a filter for liquids, and more particularly to providing a highly efficient mechanical type self-cleaning filter.

2. Description of the Related Art

Conventionally, many types of self-cleaning mechanical filters are used to remove suspended solids from solid-entrained liquids. One type among those filters is a cylindrical screen filter. In a cylindrical screen filter, a filter element having a cylindrical shape and bearing numerous perforations is placed within a sealed housing having inlet and outlet connections. In this arrangement, liquid introduced into the housing flows from the inside of the filter element out through the perforations in the filter element. The filtered liquid then exits via the outlet of the housing. As a result, the solid material strained from the liquid flowing through the filter is retained on the inside of the filter element.

The filter is designed such that the retained solids are periodically discharged, using a back flushing liquid, through a manual or automatic exhaust valve opened to atmosphere. To achieve self-cleaning of the filter element, two different methods using suction nozzle mechanisms are typically employed to create suction power for drawing away the retained solids from the filter element for expulsion through the open exhaust valve. According to one of the methods, suction scanning of the inside surface of the filter element is carried out by a plurality of nozzles, typically having narrow slit shapes, which are arranged over the entire length of the filter element area. The nozzles simply rotate closely along the inside surface of the filter element when a self-cleaning cycle is started. According to the other method, a plurality of nozzles (usually of round shapes) scan the screen inside surface in a spiral movement during each self-cleaning cycle. This latter method employing a spiral motion may require a more complex structure but assures a stronger suction power compared to the former method, because the inlet area of the suction nozzles can be designed much smaller in the latter method than in the former method.

However, when using the above-described suction nozzle mechanisms, self-cleaning efficiency and effectiveness are seriously affected by the nature of particles being filtered. A self-cleaning mechanical filter configured using the above-described mechanism may fail to serve its function when treating liquids that contain a high load of organic materials such as algae, fiber, bacteria, and other soft natural particulates. For example, "white water" from paper mills contains large quantities of fiber contaminants and dissolved soft materials. When such liquids are filtered, materials wholly or partially embedded in the filter element may not be sufficiently removed by the self-cleaning process. Further, a phenomenon referred to as the "back clogging phenomenon" may occur, in which deposits form on the outer wall of the filter element to completely clog the filter element.

SUMMARY OF THE INVENTION

The present invention provides a self-cleaning mechanical filter that can be operated for a long period of time.

According to the present invention, a filtering device comprises a cylindrical filter element, a housing which surrounds and seals the filter element, a raw water inlet for supplying pressurized raw water to a raw water chamber located on an inner side of the filter element, an outlet for discharging filtrate from a filtrate chamber located on an outer side of the filter element, a suction nozzle disposed within the raw water chamber and having an opening facing an inner surface of the filter element, a cleansing water discharge section which is connected to the suction nozzle and discharges cleansing water drawn into the raw water chamber via the suction nozzle to outside the raw water chamber, a suction control device for controlling the cleansing water discharge device to thereby control suction of the cleansing water via the suction nozzle, a suction nozzle shifting device for moving the suction nozzle along the inner surface of the filter element, a backwash nozzle disposed within the filtrate chamber in a position opposing the suction nozzle for injecting backwash water, a backwash water supply device for pressurizing backwash water and supplying the pressurized backwash water to the backwash nozzle, and a backwash nozzle shifting device for moving the backwash nozzle in synchronization with the suction nozzle.

Using this arrangement, injection of backwash water from the backwash nozzle can be performed in synchronization with suction through the suction nozzle. In this way, sufficient cleaning of the filter may be accomplished even when, due to the nature of the raw water, such sufficient cleaning cannot be achieved solely by suction through the suction nozzle. In other words, back clogging phenomenon in which suspended solids deposit on the filtrate side of the filter may be prevented reliably. Further, by moving the suction nozzle and the backwash nozzle in synchronization with one another, effective cleansing can be performed while maintaining sufficiently high speeds of backwash water injection and suction through the suction nozzle.

BRIEF DESCRIPTION OF THE DRAWINGS

FIG. 1 shows the left half portion of the cross-sectional view, while FIG. 2 shows the remaining right half portion.

FIG. 3 shows the left half portion of the cross-sectional view, while FIG. 4 shows the remaining right half portion.

DESCRIPTION OF THE PREFERRED EMBODIMENTS

The present invention will next be described in connection with preferred embodiments with reference to the attached drawings.

It should be noted that the particulars set forth below are by way of example and only for the purpose of illustrative discussion of the preferred embodiments of the present invention. The following description is directed to facilitate understanding of the principles and conceptual aspects of the invention.

Figure 1:
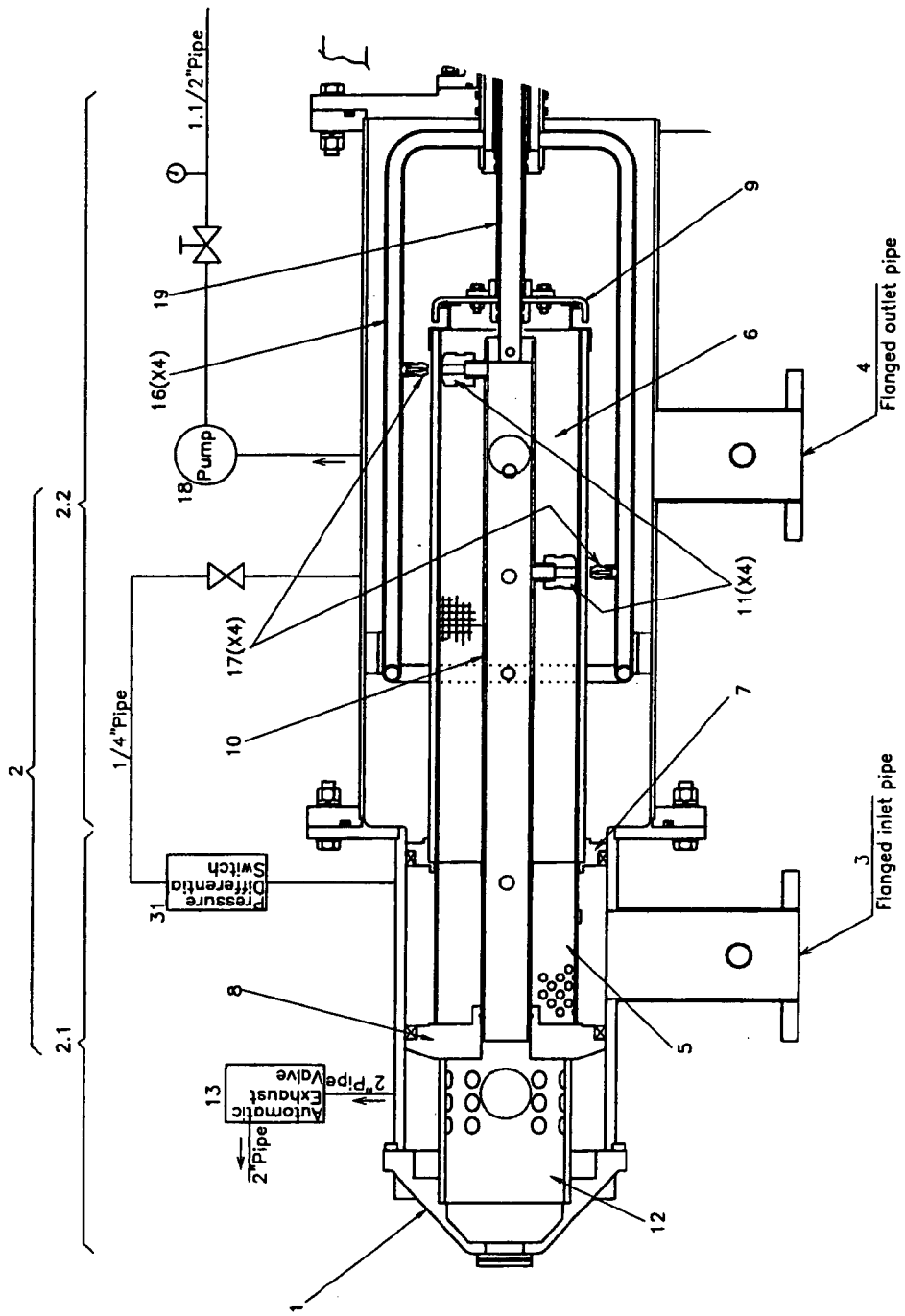
FIGS. 1 and 2 show a cross-sectional view of a self-cleaning mechanical filter according to an embodiment of the invention, wherein suction nozzles and backwash nozzles are positioned on the right side of a housing.
Figure 2:
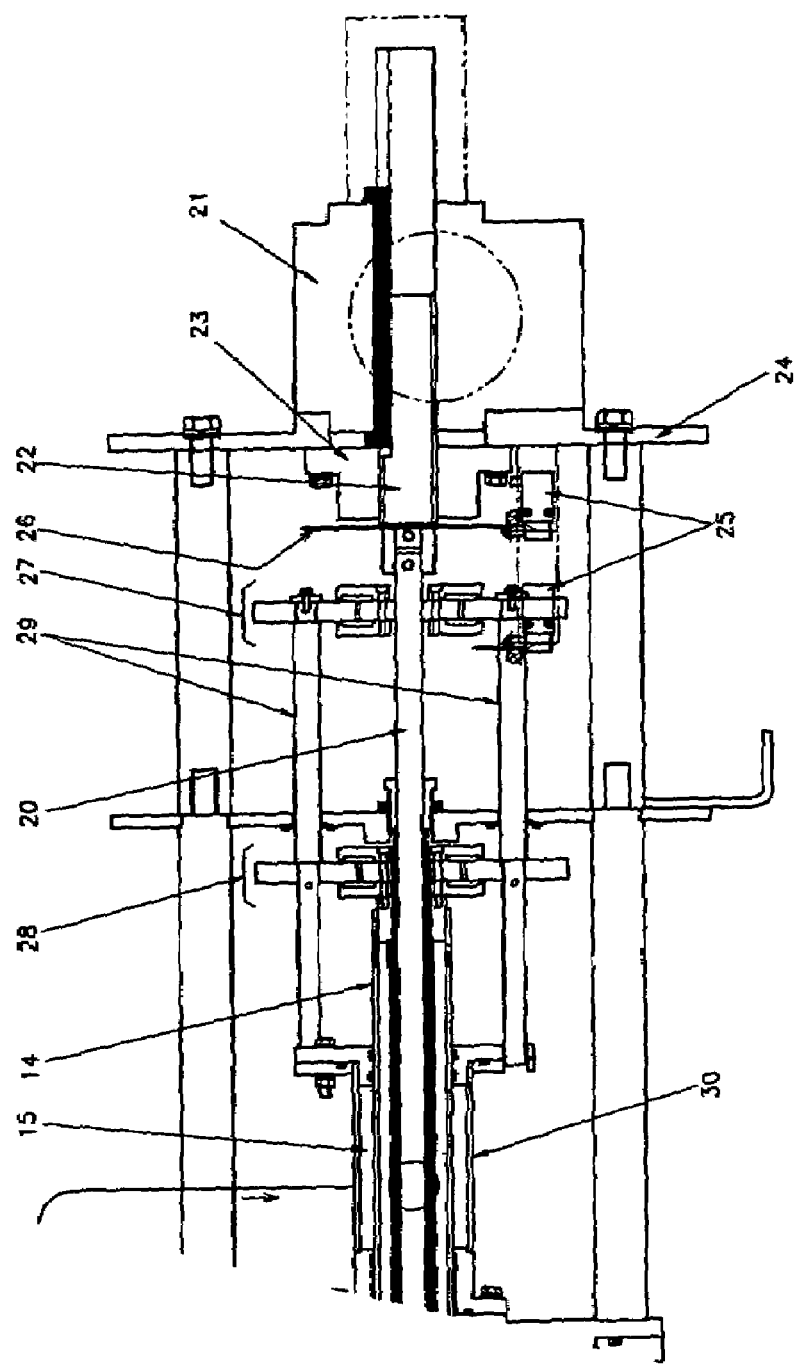
Figure 3:
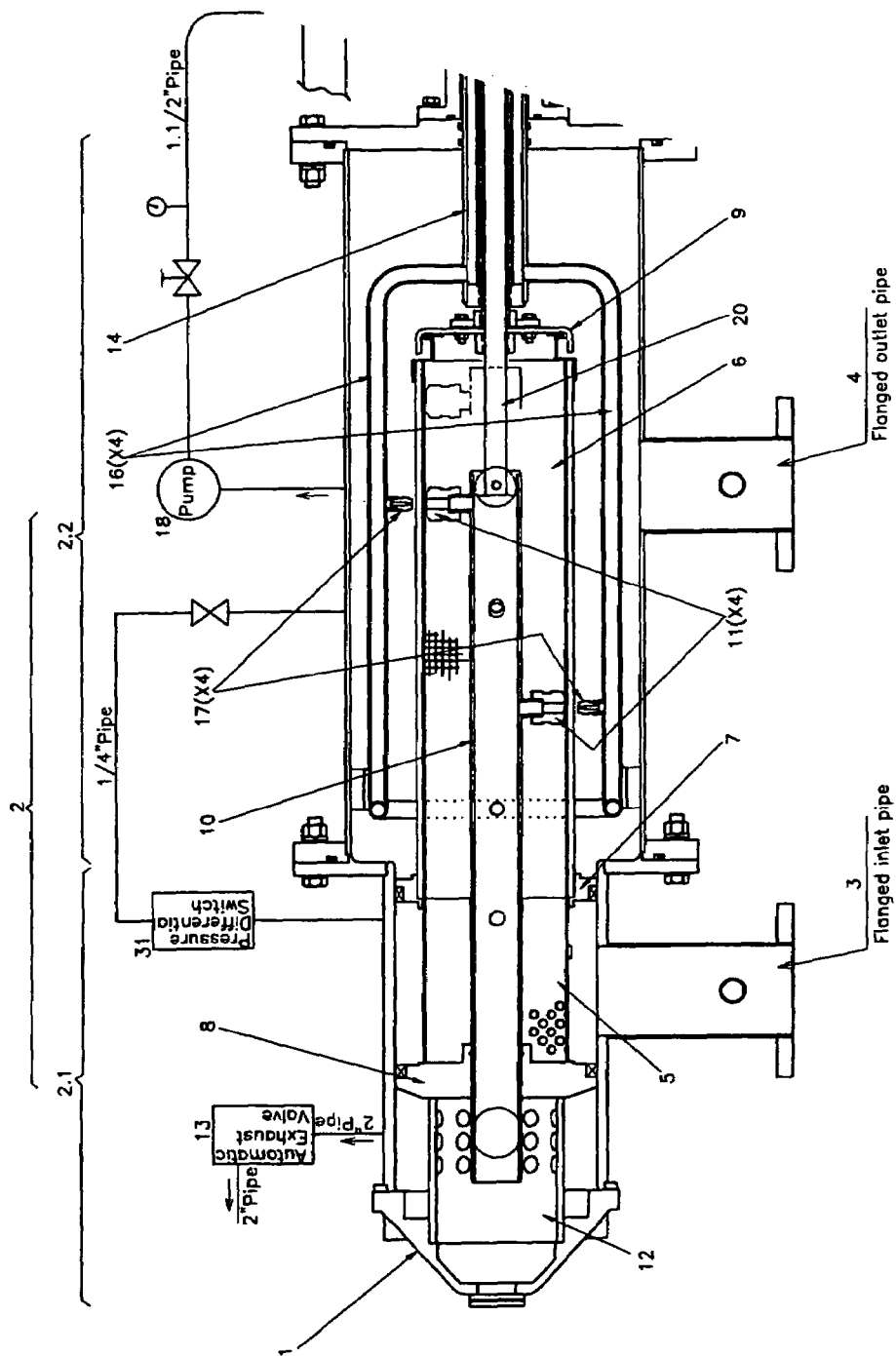
FIGS. 3 and 4 shows a cross-sectional view of the embodiment of the self-cleaning mechanical filter, wherein the suction nozzles and backwash nozzles are shifted to the left side of the housing.
Figure 4:
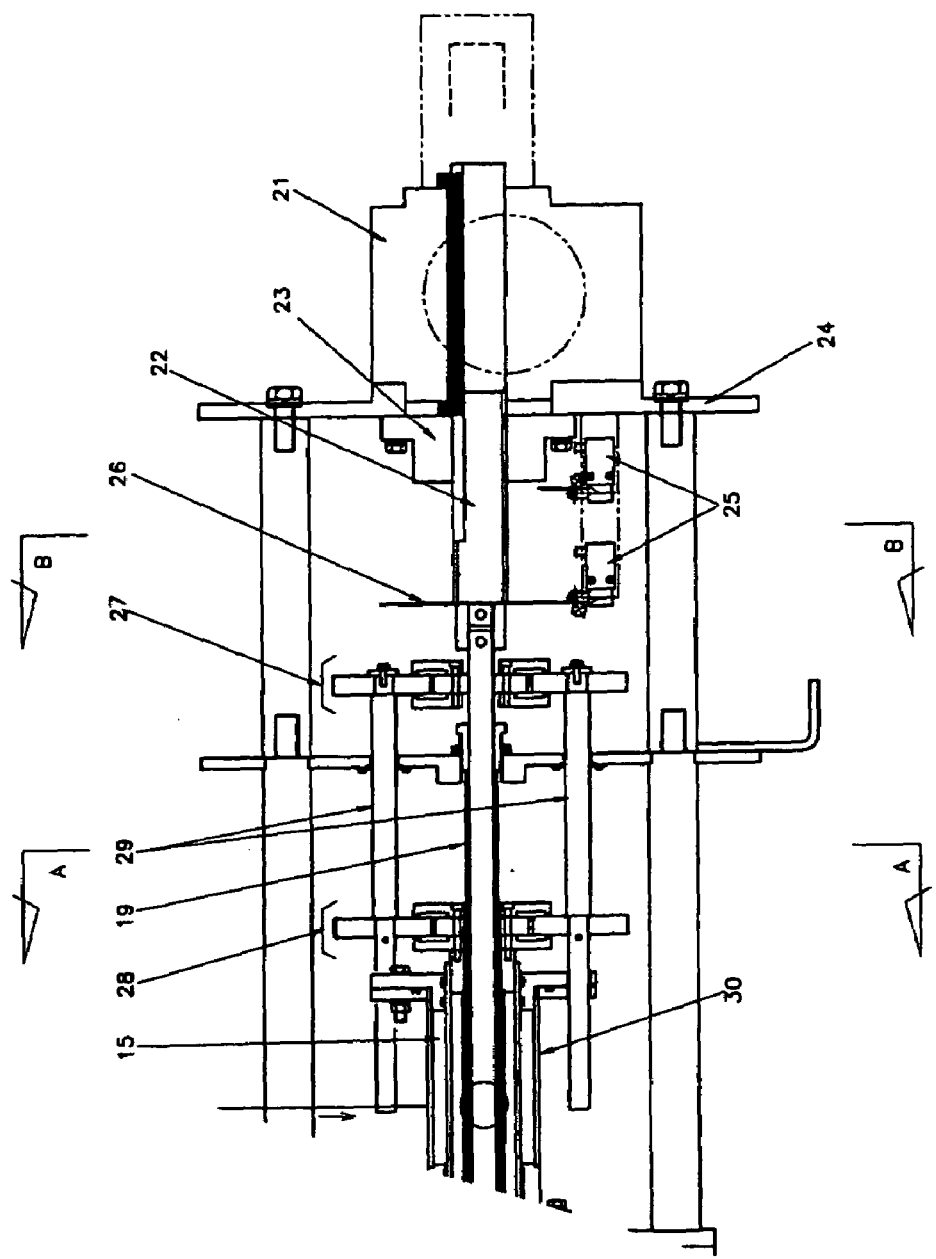
Figure 4A:
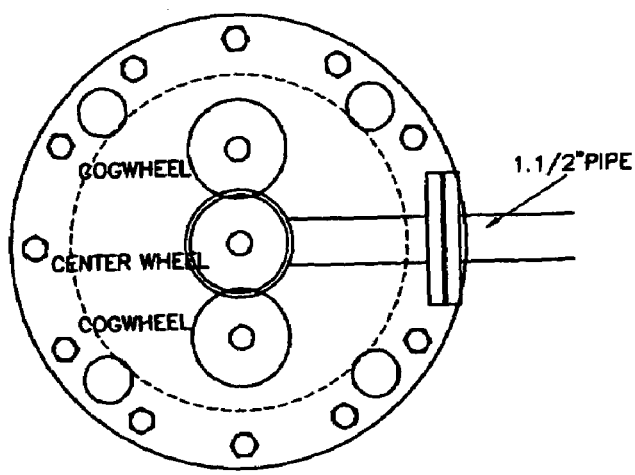
FIG. 4A shows a cross-sectional view taken along A—A in FIG. 4.
Figure 4B:
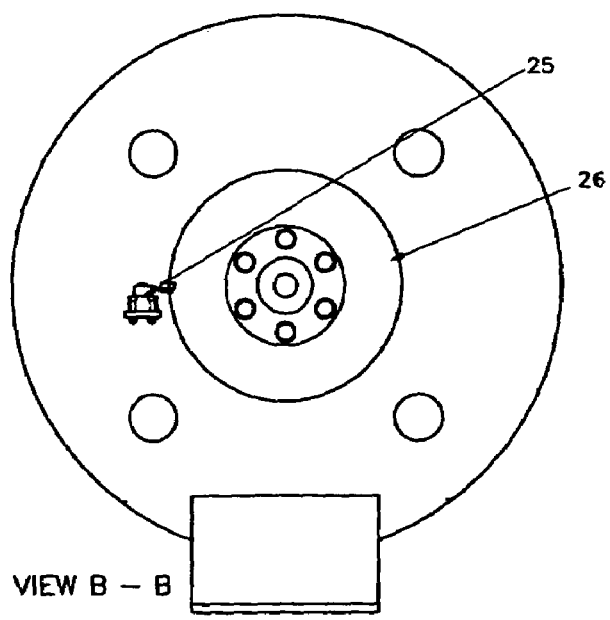
FIG. 4B shows a cross-sectional view taken along B—B in FIG. 4.
Figure 5:
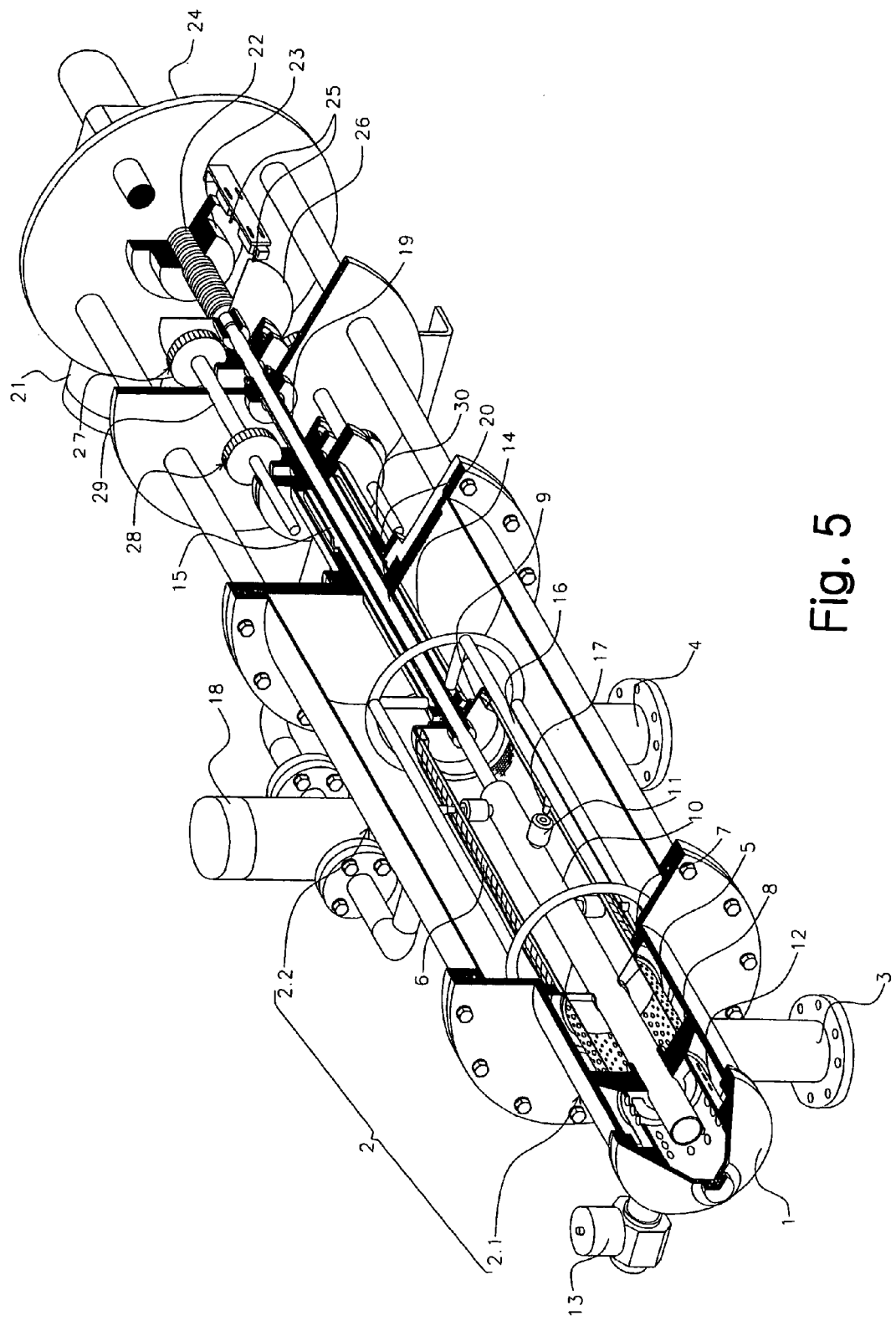
FIG. 5 is a partially cutaway perspective view of the embodiment, showing the inside of the housing.

FIGS. 1, 2 and 5 show the overall structure of a filtering device according to a preferred embodiment. As can be seen in FIG. 1, a cylindrical filter housing 2 is composed of two parts, a small diameter housing section 2.1 and a large diameter housing section 2.2, for convenience of assembly. The small diameter housing section 2.1 includes a housing lid 1 which is detachable for maintenance operation, and an inlet pipe 3 for introducing liquid to be processed. The large diameter housing section 2.2 is provided with an outlet pipe 4 for discharging filtrate.

A cylindrical coarse filter element 5 (which may be a perforated cylinder member) is placed concentrically within the small diameter housing section 2.1 and between two hydraulically sealing partitions. The partition on the right side in FIG. 1 (the side of the large diameter housing section 2.2) is the fine filter element partition 7 positioned between liquid to be filtered and filtrate of the fine filter element 6. The other partition on the left side (the side of the housing lid 1) is an exhaust chamber partition 8 positioned between the liquid to be filtered and the dirt material to be flushed out. The cylindrical coarse filter element 5 is designed to protect the self-cleaning filter device from large dirt particles by filtering large particles on its outer surface. The coarse filter element 5 is coupled to the cylindrical fine filter element 6 which is placed in the large diameter housing section 2.2. The fine filter element 6 may be composed of a stainless steel mesh member having an aperture size in the range from approximately 10 microns to approximately 1000 microns. The fine filter element 6 is supported and capped by a hydraulically sealing centering flange 9 on the right end in FIG. 1. In the present embodiment, the filtrate of the coarse filter element 5 serves as the raw water to be treated on the inner surface of the fine filter element 6. Accordingly, the region from the outer side of the coarse filter element 5 (defined by the exhaust chamber partition 8) to the inner side of the fine filter element 6 is referred to as the raw water chamber.

Liquid to be processed is first introduced via the flanged inlet pipe 3, and then passed through the cylindrical coarse filter element 5 from the outer side to the inner side for preliminary filtering. Subsequently, the filtered liquid is passed through the cylindrical fine filter element 6 from the inner side to the outer side for secondary filtering, and finally discharged from the outlet pipe 4 as processed water. In the filtering process the suspended material accumulates on the inner surface of the fine filter element 6.

As one part of the self-cleaning mechanism, a hollow suction scanner shaft 10 is provided along the centerline of the cylindrical filter housing 2. Disposed on this shaft 10 are a plurality of suction nozzles 11 which extend to approximately ⅛" from the inner surface of the fine filter element 6. The shaft 10 is sealed on one end (on the side of the sealing flange 9), while the other end is open to the exhaust chamber 12. The exhaust chamber 12 is connected to an automatic exhaust valve 13 which can be opened to atmosphere. Thus, when the automatic exhaust valve 13 is opened, the differential pressure between the supply pressure and the atmospheric pressure generated at the outlet of the exhaust chamber 12 creates a vacuum effect at the inlet of each nozzle 11. As a result, dirt material is drawn away from the fine filter element surface, through the suction scanner shaft 10, and out of the automatic exhaust valve 13.

Another part of the self-cleaning mechanism is constituted with a hollow backwash spindle 14. The backwash spindle 14 is composed of a hollow center shaft, and is provided on one end with inlets opened to a backwash chamber 15 for introducing filtrate. On the other end, the backwash spindle 14 further includes pipes 16 disposed in a cross-shape arrangement, each pipe bearing a backwash nozzle 17. Each backwash nozzle 17 extends to approximately ½" from the external surface of the fine filter element 6, and faces a corresponding suction nozzle 11 located on the inside of the fine filter element 6. The pipes 16 may be of high pressure type having a size of ½". The pipes may be connected to one another at the far end (on the left) so as to equalize the discharge pressure as evenly as possible. A booster pump 18 provided with a pressure regulator is connected between the backwash chamber 15 and the large diameter housing section 2.2. With this arrangement, a portion of the filtrate can be pressurized and fed into the backwash chamber 15. From the backwash chamber 15, the filtrate is pushed through the inlet of the hollow backwash spindle 14, advanced along the ½" pipes 16, and then jetted out through the backwash nozzles 17.

The centering flange 9 is firmly supported by a fixed hollow support rod 19. Disposed through the support rod 19 is a shaft 20 connecting between the suction scanner shaft 10 and a drive shaft 22. The connecting shaft 20 serves as a propelling axle which transmits a screw-like or rotary motion from the drive shaft 22 to the suction scanner shaft 10. The drive shaft 22, which is connected to the right end of the connecting shaft 20, is a revolving screw (worm) driven by a geared electric motor 21. Via a drive bushing 23 provided on the motor base, the drive shaft 22 can be rotated and axially moved forward or backward according to the revolving direction of the geared electric motor. By this movement, the suction nozzles 11 are moved over the entire inner surface of the fine filter element 6. The excursion of the drive shaft 22 is limited by two limit switches 25 and a limit switch plate 26 which are appropriately disposed along the drive shaft housing 24.

In order to drive the hollow backwash spindle 14, the connecting shaft 20 is provided with a first gear assembly unit 27. The first gear assembly unit 27 comprises a center wheel mounted on the connecting shaft and two cogwheels. These three wheels have the same diameters, are toothed identically, and mesh together in line. Each cogwheel has a shaft 29 which extends in parallel with the connecting shaft 20 and through a second gear assembly unit 28 and the flange of the backwash chamber housing 30. The second gear assembly unit 28 comprises two cogwheels provided for the respective two shafts 29. These two cogwheels mesh with a center wheel which is attached to the end of the hollow backwash spindle 14. All of the above-noted wheels must have the same diameter and be toothed in the same manner, so as to allow the suction scanner shaft 10 and the hollow backwash spindle 14 to rotate and move synchronously in the same cycle. The bearings of the wheels in each gear assembly unit may be composed of a highly durable plastic material to cope with mechanical stress which may occur in transmitting axial motion from the drive shaft 22 to the hollow backwash spindle 14.

During operation of the self-cleaning mechanical filter according to the present embodiment, a cleaning cycle is performed as follows. First, the exhaust valve is opened to atmosphere. A few seconds later, the booster pump 18 is started. In addition, the geared electric motor unit 21 starts to rotate the suction scanner shaft 10 as well as the hollow back wash spindle 14. During each cleaning cycle, the motor unit 21 rotates the shaft 10 and the spindle 14 such that the suction nozzles 11 and the backwash nozzles 17 are moved over the entire filter element 6 along its surfaces on both sides. As will be known, the self-cleaning cycle performed as an automatic process may be initiated by a pressure differential switch 31 which activates at a point when dirt material is accumulated on the fine filter element 6 (when the pressure differential across the fine filter element reaches a pre-set value), and/or by a timer which activates at predetermined time intervals.

The degree of self-cleaning efficiency attained by the present invention is sufficiently high such that the present invention is particularly suitable for filtration of liquids containing a high load of organic materials, such as an effluent from paper mills (white water), pre-treated sewage water, and the like. In an example case in which a filtering device according to the above-described embodiment was employed for treating white water, the filtering device could continuously operate over 6 months without requiring to cease filtration for manually cleaning the fine filter element.

It will be evident to those skilled in the art that the present invention is not limited to the details of the foregoing illustrative embodiment. For example, changes may be made in the drive mechanism for the suction nozzles and the backwash nozzles. Further, only one each of suction nozzle and backwash nozzle may be provided, or, alternatively, more than 5 each of those nozzles may be provided. The present embodiment is to be considered in all respects as illustrative and not restrictive. The scope of the present invention is solely defined by the appended claims.

What is claimed is:
1. A filtering device, comprising:
a cylindrical filter element;
a housing which surrounds and seals the filter element;
a raw water inlet for supplying pressurized raw water to a raw water chamber located on an inner side of the filter;
an outlet for discharging filtrate from a filtrate chamber located on an outer side of the filter element;
a suction nozzle disposed within the raw water chamber and having an opening facing an inner surface of the filter element;
a cleansing water discharge section connected to the suction nozzle, which discharges cleansing water drawn into the raw water chamber via the suction nozzle to outside the raw water chamber;
a suction control device for controlling the cleansing water discharge device to thereby control suction of the cleansing water via the suction nozzle;
a suction nozzle shifting device for moving the suction nozzle along the inner surface of the filter element;
a backwash nozzle disposed within the filtrate chamber in a position opposing the suction nozzle for injecting backwash water;
a backwash water supply device for pressurizing backwash water and supplying the pressurized backwash water to the backwash nozzle; and
a backwash nozzle shifting device for moving the backwash nozzle in synchronization with the suction nozzle, wherein
the suction nozzle and the backwash nozzle are moved in synchronization with one another along axial and circumferential directions of the filter.

\* \* \* \* \*

UNITED STATES PATENT AND TRADEMARK OFFICE
CERTIFICATE OF CORRECTION

PATENT NO. : 7,055,699 B2
APPLICATION NO. : 10/930059
DATED : June 6, 2006
INVENTOR(S) : Mitsuo Takatsuka It is certified that error appears in the above-identified patent and that said Letters Patent is hereby corrected as shown below:

In the patent, please correct the following:

Col. 2, line 15, replace "the raw water" with "an exhaust";
line 16, replace "raw water" with "exhaust";
Col. 6. line 15, replace "the raw water" with "an exhaust";
line 16, replace "raw water" with "exhaust".

Signed and Sealed this

Fifth Day of September, 2006

JON W. DUDAS
*Director of the United States Patent and Trademark Office*

UNITED STATES PATENT AND TRADEMARK OFFICE
CERTIFICATE OF CORRECTION

PATENT NO. : 7,055,699 B2  Page 1 of 1
APPLICATION NO. : 10/930859
DATED : June 6, 2006
INVENTOR(S) : Mitsuo Takatsuka It is certified that error appears in the above-identified patent and that said Letters Patent is hereby corrected as shown below:

In the patent, please correct the following:

Col. 2, line 15, replace "the raw water" with "an exhaust";
line 16, replace "raw water" "exhaust";
Col. 6. line 15, replace "the raw water" with "an exhaust";
line 16, replace "raw water" with "exhaust".

This certificate supersedes Certificate of Correction issued September 5, 2006.

Signed and Sealed this

Seventh Day of November, 2006

JON W. DUDAS
*Director of the United States Patent and Trademark Office*